March 24, 1942.  A. DE L. SINDEN  2,277,039

CONVEYER

Filed April 3, 1940

INVENTOR.
Alfred DeLos Sinden
BY J. Stanley Churchill
ATTORNEY.

Patented Mar. 24, 1942

2,277,039

UNITED STATES PATENT OFFICE 2,277,039

CONVEYER

Alfred De Los Sinden, Aurora, Ill., assignor to Redler Conveyor Company, Quincy, Mass., a corporation of Massachusetts Application April 3, 1940, Serial No. 327,667

7 Claims. (Cl. 198—174)

This invention relates to a conveyer and to a conveying element therefor.

The invention has for an object to provide a novel and improved conveyer which is particularly adapted among other uses for conveying material in curved paths lying substantially in the same plane and embodying a novel structure of conveying element.

With this general object in view and such others as may hereinafter appear, the invention consists in the conveyer and in the various structures, arrangements and combinations of parts hereinafter described and particularly defined in the claims at the end of this specification.

Figure 1:
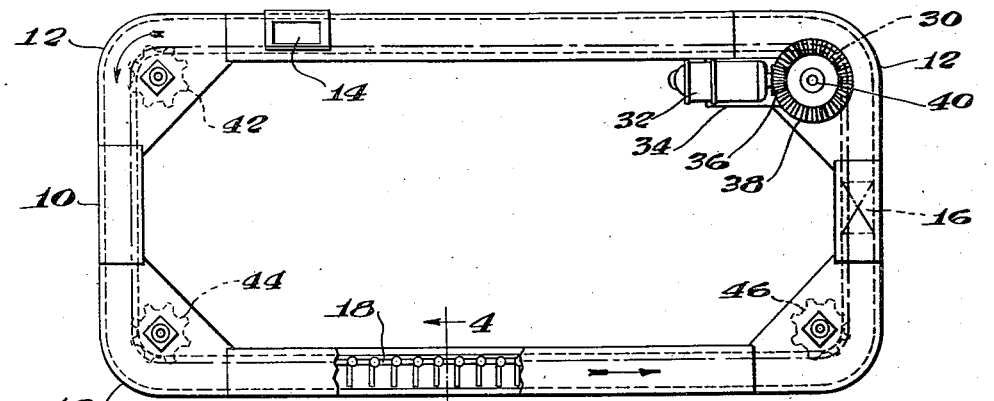
Figures 2, 3, 4:
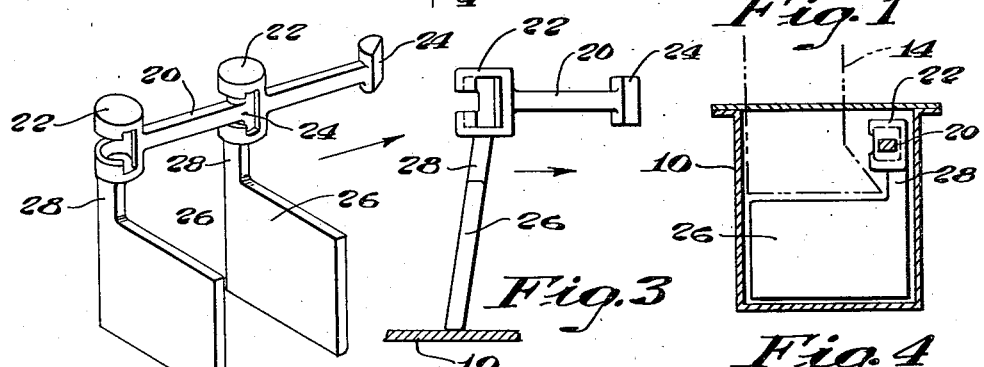
Figures 5, 6:
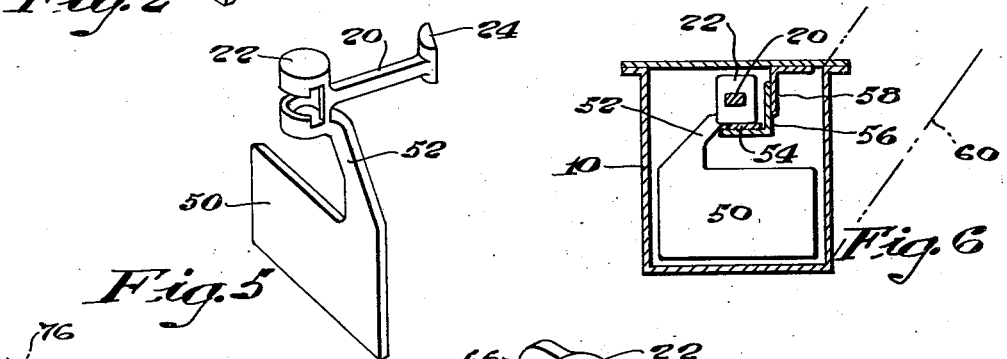
Figures 7, 8:
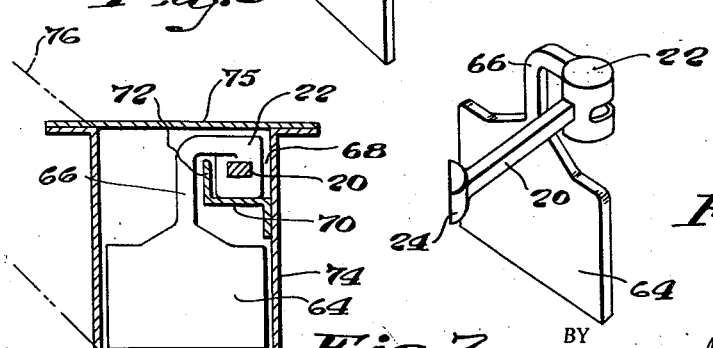

In the drawing illustrating the preferred embodiment of the invention, Fig. 1 is a plan view of a conveyer embodying the present invention; Fig. 2 is a perspective detail view of a portion of the conveying element employed in the conveyer; Fig. 3 is a side elevation of one of the flights of the conveying element shown in Fig. 2; Fig. 4 is a cross-sectional view taken on the line 4—4 of Fig. 1; Fig. 5 is a perspective view of a modified form of flight for the conveying element; Fig. 6 is a sectional view showing the flight of Fig. 5 in the conveyer; Fig. 7 is a sectional view of another modified form of flight for the conveying element; and Fig. 8 is a perspective view of the flight shown in Fig. 7.

In general, the present invention contemplates a conveyer of the type in which the material is conveyed through a trough or casing by a plurality of connected conveyer flights. In the preferred and illustrated embodiment of the invention, the conveyer comprises a trough or casing 10 which is herein shown as extending in a general rectangular path and with the corner portions 12 curved, as illustrated. The casing may and preferably will be provided with the usual inlet 14 and outlet 16, as illustrated.

The present conveying element, indicated generally at 18, is made up of a plurality of connected flights or links of solid construction, one embodiment of which, as illustrated in detail in Fig. 2, may comprise a connecting link 20 having a slotted hub 22 at one end and having a boss 24 at the other end which is adapted to be received within the hollow hub 22 of the next succeeding flight of the conveying element. I the embodiment shown in Fig. 2, a solid flight member 26 of general rectangular shape is connected integrally with the hollow hub 22 by a depending portion 28, and the flight member is disposed substantially at right angles to the link 20, extending transversely from one side of the casing 10, as illustrated in Fig. 4.

In the illustrated embodiment of the invention, the conveying element 18 is arranged to be drawn through the casing 10 by a driving sprocket 30 which is driven from a suitable source of power, such as a motor 32, mounted on a base 34 attached to the upper section of the casing above the conveying element. The sprocket 30 is driven through bevel gears 36, 38, the latter being fixed to a vertical shaft 40 upon which the sprocket 30 is secured. Idler sprockets 42, 44, 46 are also provided at the corners 12 over which the conveying element is arranged to pass. As clearly illustrated in Fig. 3, the individual flight members 26 are slightly inclined rearwardly with respect to the direction of travel through the casing, as indicated by the arrows, so that in operation, as the flights are dragged through the conveyer they will tend to glide smoothly along the bottom wall of the casing 10, thus reducing to a minimum the vibration and noise ordinarily resulting from contact of the flight members with the casing.

From the description thus far, it will be observed that, in operation, the material introduced into the conveyer through the inlet 14 is carried along between the flight members 26 and is arranged to fall by gravity through the discharge opening 16. As shown in dotted lines in Fig. 4, the inlet hopper 14 may be extended into the casing below the level of the connecting links 20 in order to determine the level of the material in the casing. The links are thus disposed above the level of the material, and as a result of this construction, during the operation of the conveyer, minimum opportunity is afforded the goods to enter the slotted hubs 22, and as a result, maximum freedom of pivotal movement is afforded the parts as the conveyer element is drawn through the casing. Sufficient clearance is provided between the side edges of the flights and the walls of the casing to provide for maximum efficiency in performance, and in operation, as the material is carried along between the flights, it tends to level itself off. The solid construction of the flight members is particularly advantageous when conveying certain nonfreely flowing materials where it is desired to entirely clear the conveyer of material when the supply thereto is cut off in order to permit the conveyer to be used for running a different kind of material.

Referring now to Figs. 5 and 6, as therein shown, a modified form of a conveying element of solid construction may comprise a plurality of connected members, each comprising the link 20 having a hollow hub portion 22 at one end and a boss 24 at the other end, and also having a solid flight member 50 of general rectangular shape integrally connected to the hollow hub portion of the link by a connecting portion 52. In this modification, the link is disposed above and substantially intermediate the side edges of the solid flight 50 and the connecting portion 52 is angularly extended from one edge of the flight to the hollow hub 22. Provision is also made for supporting the conveying element in the casing, and as shown herein, a track 54 is provided within the casing, arranged to receive the link portions of the conveying element with the hub portions 22 in sliding engagement with the track or rail 54. The rail is supported in an intermediate position with respect to the side walls of the casing by angle members 56, 58 mounted, as shown, upon the underside of the top section of the casing. The material may be introduced into the casing 10 through a side inlet 60, as shown in Fig. 6. With this construction, the conveying element 18 is supported to dispose the bottom edge of the flight slightly above the bottom wall of the casing to reduce to a minimum noise and wear. The supporting angle members form a guard to prevent the material from coming in contact with the connecting links. In operation, the material tends to level itself off to a height substantially even with the top edge of the flight members 50.

Another modification of the solid flight conveying element, as illustrated in Figs. 7 and 8, may comprise a plurality of connected flight members, each having link portions 20, 22, 24 and a solid flight portion 64 integrally connected with the hollow hub portion 22 by a connecting member 66 extending vertically from a position intermediate the side edges of the solid flight member and then horizontally to one side to connect with the top of the hollow hub portion 22, as shown in Fig. 7. As illustrated, the link portion is disposed above and to one side of the solid flight member, and is arranged to run in a separate trough or track 68 disposed within the casing whereby to support the conveying element in a predetermined position with respect to the casing. The trough 68 may be supported from one side wall 74 of the casing and is provided with a horizontally extended portion 70 and an upstanding edge portion 72 which, in cooperation with the side wall 74 of the casing 10, serves as a guide to limit the lateral movement of the link portion and the solid flight member. Likewise, the horizontally extended portion 70 in cooperation with the top section 75 of the casing serves to limit vertical movement of the flight members. The material may be introduced into the casing through a side inlet 76, as indicated by dotted lines in Fig. 7. The conveyer thus constructed provides maximum support for the conveying element and also provides maximum protection for the link portions from contact with the material in the casing.

From the above description it will be observed that the present construction of a conveyer provided with a conveying element having solid flight members is adapted to efficiently convey materials in various paths and particularly in curved paths lying substantially in the same plane and the conveyer is particularly adapted to be used for conveying non-freely flowable materials.

While the preferred embodiment of the invention has been herein illustrated and described, it will be understood that the invention may be embodied in other forms within the scope of the following claims.

Having thus described the invention, what is claimed is:

1. In a conveyer of the character described, in combination, a casing, an endless conveying element traversable therethrough, said conveyer element comprising a plurality of detachably and pivotally connected flight members, said flights comprising substantially rectangular and transversely extended flight portions of solid construction each having a top edge, and longitudinally extended connecting links disposed above said flight portions and intermediate the side edges thereof, each of said links being provided with a vertically disposed hollow hub portion and a relatively narrow portion extended angularly from one side of said top edge for integrally connecting the top edge of said flight to the hub, each of said links being also provided with a lug for reception in the hollow hub of a preceding member, and means within said casing extending from a wall thereof and including a transverse portion disposed between said rectangular flight portions and said connecting links and serving as a support for said conveyer element.

2. In a conveyer of the character described, in combination, a casing, a conveying element traversable through said casing, said conveying element comprising a plurality of pivotally connected flight members comprising transversely extended flight portions of solid construction and longitudinally extended connecting links disposed above and intermediate the side edges of said solid flight portions each having a top edge, said links being integrally connected with said flight portions by a relatively narrow portion angularly extended from one side of said top edge, and a track disposed within and projecting from a wall of said casing to a point beneath said connecting means and along which said connecting links are arranged to slide whereby to support said conveying element.

3. In a conveyer of the character described, in combination, a casing, a conveying element traversable through the casing, said conveying element comprising a plurality of pivotally connected flight members, each of said flights comprising a transversely extended flight portion of solid construction and a longitudinally extended connecting link disposed above and substantially in alignment with one side edge of said solid flight portion, said link being integrally connected with said flight portion by a relatively narrow portion extended vertically from said flight and intermediate the side edges thereof and having a horizontally extended portion connected to the top of said link, and a track for the conveying element disposed within the casing including a flange portion lying between said narrow vertical portion and said link.

4. In a conveyer of the character described, in combination, a casing, a conveying element traversable through the casing, said conveying element comprising a plurality of pivotally connected flight members, each of said flights comprising a transversely extended body portion of solid construction and a longitudinally extended connecting link disposed above and substantially in alignment with one side edge of said solid body portion, said link being integrally connected with said body portion by a relatively narrow portion extended vertically from said body and intermediate the side edges thereof and having a horizontally extended portion connected to the top of said link, and a trough disposed within and mounted upon a wall of said casing in a plane above the solid portion of said flight and arranged to receive said connecting links adapted to support said conveying element in predetermined vertical relation to said casing and in spaced relation to the side walls thereof.

5. In a conveyer of the character described, in combination, a casing, a conveying element arranged to be drawn through the casing, said conveying element comprising a plurality of pivotally connected flights, each of said flights comprising a flat plate extended transversely of the casing, a hollow hub formed integrally therewith, and a link connected with the hub and shaped for connection with the hub of an adjacent flight, and a track within said casing secured to the top wall thereof and having a portion lying in a plane below said hub portions and serving as a support for said conveying element.

6. In a conveyer of the character described, in combination, a casing, and an endless conveying element traversable therethrough, said conveyer element including a plurality of pivotally connected flight members comprising substantially rectangular solid plate-like portions of substantially uniform thickness, an integral extension projecting upwardly from said plate-like portions, and an integral connecting member extending from said extensions above said plate-like portions, and means within said casing projecting from a wall thereof and including a portion disposed between said plate-like portions and said connecting members and serving as a support for said conveyer element.

7. In a conveyer, of the character described, in combination, a casing; an endless conveyer element traversable therethrough, said conveyer element comprising a plurality of detachably and pivotally connected flight members, said flight members comprising substantially rectangular and transversely extending body portions of solid cross-section each having a top edge, longitudinally extending connecting links disposed above said body portions and intermediate the side edges thereof, each of said links being provided with a vertically disposed hollow hub portion and a relatively narrow portion extended angularly from one side of said top edge and integrally connecting the top edge of said body to the hub, each of said links being also provided with a lug for reception in the hollow hub of a preceding flight member, and a supporting track within said casing having a portion disposed in a plane between said body portions and said hollow hub portions arranged to receive and support said connecting links in predetermined relation to the walls of said casing.

ALFRED DE LOS SINDEN.